(12) United States Patent
Shen

(10) Patent No.: US 6,717,976 B1
(45) Date of Patent: Apr. 6, 2004

(54) METHOD AND APPARATUS FOR SIGNAL TO NOISE POWER RATIO ESTIMATION IN A MULTI SUB-CHANNEL CDMA RECEIVER

(75) Inventor: Qiang Shen, Nepean (CA)

(73) Assignee: Nortel Networks Ltd., St. Laurent (CA)

( * ) Notice: Subject to any disclaimer, the term of this patent is extended or adjusted under 35 U.S.C. 154(b) by 0 days.

(21) Appl. No.: 09/216,934

(22) Filed: Dec. 21, 1998

(51) Int. Cl.[7] .................................................. H04B 1/76
(52) U.S. Cl. ......................... 375/147; 455/522; 455/69; 370/318
(58) Field of Search ................................. 375/146, 147, 375/148, 150, 219, 227, 260, 262, 267, 279, 280, 340, 341, 342, 343, 346, 347, 349; 370/318, 320, 342, 335, 441; 455/517, 522, 512, 68, 69, 70, 571, 574, 134, 135, 226.1, 226.2, 226.3

(56) References Cited

U.S. PATENT DOCUMENTS

| | | | | |
|---|---|---|---|---|
| 5,216,692 A | * | 6/1993 | Ling | 340/7.33 |
| 5,412,686 A | * | 5/1995 | Ling | 375/147 |
| 5,590,409 A | * | 12/1996 | Sawahashi et al. | 370/342 |
| 5,603,096 A | * | 2/1997 | Gilhousen et al. | 455/69 |
| 5,737,327 A | * | 4/1998 | Ling et al. | 370/318 |
| 5,812,938 A | * | 9/1998 | Gilhousen et al. | 455/517 |
| 5,896,411 A | * | 4/1999 | Ali et al. | 375/130 |
| 5,982,760 A | * | 11/1999 | Chen | 370/335 |
| 6,070,085 A | * | 5/2000 | Bender et al. | 455/411 |
| 6,097,712 A | * | 8/2000 | Secord et al. | 370/335 |
| 6,097,972 A | * | 8/2000 | Saints et al. | 455/115 |
| 6,154,659 A | * | 11/2000 | Jalali et al. | 455/522 |
| 6,178,194 B1 | * | 1/2001 | Vasic | 375/136 |
| 6,185,266 B1 | * | 2/2001 | Kuchi et al. | 375/347 |
| 6,269,239 B1 | * | 7/2001 | Hashem et al. | 370/311 |
| 6,272,354 B1 | * | 8/2001 | Saario | 455/422 |
| 6,377,809 B1 | * | 4/2002 | Rezaiifar et al. | 455/455 |
| 6,396,867 B1 | * | 5/2002 | Tiedemann et al. | 370/342 |

* cited by examiner

*Primary Examiner*—Khai Tran
*Assistant Examiner*—Khanh Cong Tran
(74) *Attorney, Agent, or Firm*—Bruce Garlick

(57) ABSTRACT

The present invention provides a method and apparatus for regulating the transmission power of a transmitter generating a CDMA signal. The CDMA signal is transported over a main channel which includes a plurality of sub-channels, each sub-channel associated with a particular sub-signal of the CDMA signal. The apparatus includes primarily an SNR estimator functional bloc and a logical functional bloc. The SNR estimator functional block receives as input the sub-signals and is responsible for commuting an estimate of the ratio of the total signal energy in the sub-signals to the total noise energy in the sub-signals. The logical functional bloc generates a control signal in dependence of the SNR estimation computed by the SNR estimation functional bloc. This control signal is sent back to the transmitter generating the CDMA signal, and is indicative of either a power-up or power-down command for regulating the transmission power of the transmitter.

16 Claims, 3 Drawing Sheets

METHOD AND APPARATUS FOR SIGNAL TO NOISE POWER RATIO ESTIMATION IN A MULTI SUB-CHANNEL CDMA RECEIVER

FIELD OF THE INVENTION

The present invention relates to the field of wireless communications, more particularly to a method and apparatus for estimating signal to noise power ratio in a multi sub-channel CDMA receiver. The estimation may be effected to control the transmitting power between base station and mobiles.

BACKGROUND OF THE INVENTION

CDMA (Code Division Multiple Access) is a digital air interface standard, employing a commercial adaptation of military spread-spectrum single-sideband technology. More specifically, it is a form of digital cellular phone service that is a spread-spectrum technology which assigns a code to all speech bits, sends scrambled transmission of the encoded speech over the air, and reassembles the speech to its original format. In a CDMA system, each user is given a unique sequence (pseudo-random code) . This sequence identifies the user. For example, if user-A has sequence-a and user-B has sequence-b, a receiver wanting to listen to user-A would use sequence-a to decode the wanted intelligence It would then receive all the energy being transmitted by user-A and disregard the power transmitted by user-B. Because system users are isolated by code, they can share the same carrier frequency, partially eliminating the frequency reuse problem encountered by other cellular systems, such as AMPS and DAMPS.

CDMA is an interference limited system. Although it has a soft capacity limit, each user is a noise source on the shared channel and the noise contributed by users accumulates. This creates a practical limit to how many users a system will sustain. Mobiles that transmit excessive power increase interference to other mobiles. For CDMA, precise power control of mobiles is critical in maximizing the system's capacity and increasing battery life of the mobiles. The goal is to keep each mobile at the absolute minimum power level that is necessary to ensure acceptable service quality. Ideally, the power received at the base station from each mobile should be equal, resulting in the minimum signal to interference. If the power of each user with a cell is not controlled such that they do not appear equal at the base station receiver, then the near-far problem occurs. This problem occurs when many mobile users share the same channel. In general, the strongest received mobile RF (Radio Frequency) signal will capture the demodulator at a base station In CDMA, stronger received signal levels raise the noise floor at the base station demodulators for the weaker signals, thereby decreasing the probability that weaker signals will be received.

Thus, in CDMA mobile systems, closed loop power control is essential to maintain the received power level at the base station or mobile station receivers. The receiver side should perform an estimation of the received signal and noise power level, and compare it with the Signal to Noise Ratio (SNR) threshold. If the received SNR level is lower than the threshold, a power-up command, typically a single bit, is sent to the transmitter to increase the transmitting power. Otherwise, a power-down command is sent to lower the transmitting power.

Such a power control command is embedded in the forward CDMA channel (used for transmitting from the base station or cell site) in the form of reverse power control bits. These occur in pseudo-random positions in each 1.25 ms interval (Power Control group or PWC), or 16 times per frame, as per the Air Interface Standard IS-95 and the CDMA2000 Standard. Each power control bit is interpreted as a command to raise or lower power by a predetermined increment. Each base station makes power control decisions independently for each mobile. The mobile station is responsible for demodulating the power control bits and raising or lowering its power accordingly. The goal of the power control is to maintain the reverse channel transmit power at the lowest possible level commensurate with adequate error performance.

One approach common to CDMA systems is the use of a Rake receiver for combining the information obtained from several resolvable multipath components in order to provide an enhanced signal with better voice/data quality. The Rake receiver includes a bank of correlators, also referred to as demodulators, each of which correlate to a particular multipath component of the desired signal. The correlator outputs, commonly referred to as the Rake channels or fingers, may be weighted according to their relative strengths and summed to obtain a final signal estimate.

Obviously, it is important to accurately obtain an estimation of the received signal to noise power ratio for proper power control bit generation. In the current implementation of the Air Interface Standard IS-95 reverse channel (used for receiving calls at the cell site from the mobiles), there is only one channel per user link. The reverse channel uses 64-ary orthogonal modulation symbols, specifically Walsh functions of order 64, and the SNR estimation is performed by processing the Walsh spectrum of the Rake output. There are 64 elements in the orthogonal demodulation output of the Rake receiver. By regarding the largest element as the signal contribution and the rest as being caused by noise and interference, one can obtain the SNR estimation at the Rake receiver output.

Unfortunately, difficulties in efficient SNR estimation arise with the most recent CDMA systems, implemented in accordance with the third generation 3G IS-95 Air Interface Standard, whereby each channel between one user and the base station can have up to four integrated sub-channels, with their rates and relative power levels changeable. In addition, these channels use Binary Phase Shift Keying (BPSK) modulation, a digital linear modulation technique, as opposed to multi-ary orthogonal modulation. In the 3G IS-95 wireless CDMA system, the pilot signal is used to perform coherent detection of the BPSX signal, and there is no longer the multi-ary output as in the IS-95 system.

Thus, there exists a need in the industry to provide a method and apparatus for performing signal to noise power ratio estimation in a multi sub-channel CDMA receiver.

SUMMARY OF THE INVENTION

In summary, the present invention provides a method and an apparatus for generating a control signal that conveys an estimation of the signal to noise power ratio (SNR) in a multi sub-channel CDMA channel. Such a channel can typically be the reverse channel between a mobile transmitter and a base station. The control signal can be used to regulate the power-up/power-down command sent by the base station to the mobile transmitter.

In a specific example, the apparatus is incorporated in a CDMA receiver. The estimated SNR conveyed by the control signal is compared to a dynamic threshold set in accordance with the Frame Error Rate (FER) measured at the output of the receiver. A power control command is then determined based on the comparison. More specifically, if the SNR is higher than the threshold, a power-down command is sent to the mobile transmitter. If the SNR is lower than the threshold, a power-up command is sent.

Under this example, the SNR estimation needed for closed loop power control is implemented at the Rake receiver combiner output. The combiner performs complex maximum ratio combining of the Rake finger outputs, each weighed by the complex conjugate of the channel estimation from the pilot channel. The imaginary part of the output is due to the noise and the estimation error. By averaging the squares of real and imaginary parts of the combiner outputs over one power control group and over all channels, the total received signal energy and noise power can be estimated. Since all the channels are considered, this novel method does not need to know the exact power allocations among all sub-channels, which might change due to adjustment or inaccuracy of the physical devices.

BRIEF DESCRIPTION OF THE DRAWINGS

These and other features of the present invention will become apparent from the following detailed description considered in connection with the accompanying drawings. It is to be understood, however, that the drawings are provided for purposes of illustration only and not as a definition of the boundaries of the invention, for which reference should be made to the appending claims.

DESCRIPTION OF A PREFERRED EMBODIMENT

Figure 1:
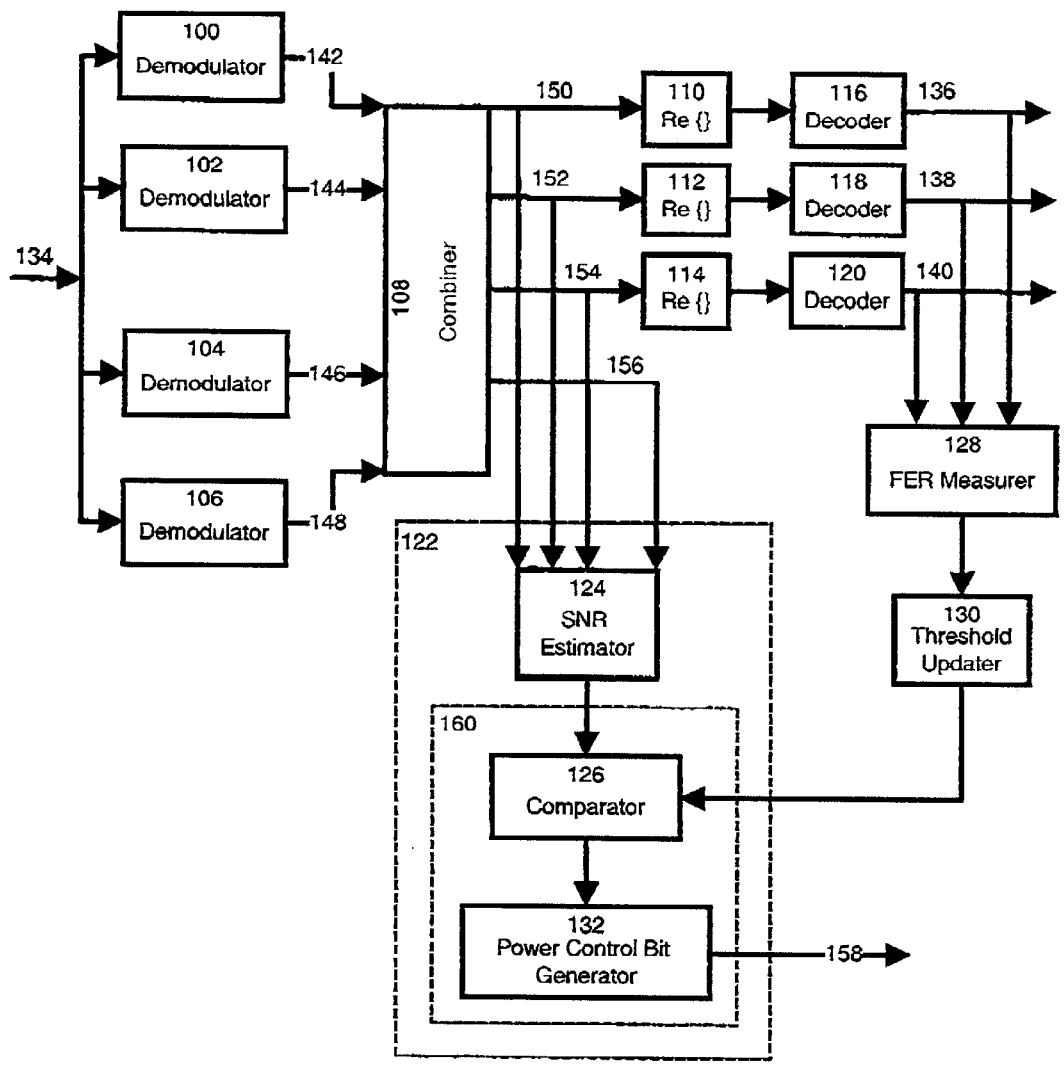
FIG. 1 is a block diagram of the basic structure of a base station receiver, in accordance with a most preferred embodiment of the present invention.

In a preferred embodiment of the present invention, the apparatus for estimating the SNR is implemented in a CDMA receiver of a base station. An example of the basic structure of this base station receiver is shown in FIG. 1. The baseband signal processing performed by the receiver includes demodulation, combination, channel separation, decoding and reverse channel closed loop power control bit generation.

The input 134 to the Rake receiver corresponds to a signal received at the base station. This input is the reverse channel sent from the mobile transmitter, plus interference and noise. The signal over this channel is a BPSK modulated and quadra-phase spread signal, comprising both an in-phase component and a quadrature component. As BPSK modulation has been well documented and is well known to those skilled in the art, it will not be described in further detail. This signal 134 is fed into a bank of demodulators, in this ample demodulators 100, 102, 104 and 106 forming a Rake receiver. Note that the number of demodulators in a Rake receiver may vary. Each demodulator is responsible for performing coherent (synchronous) demodulation of its corresponding BPSK signal multipath component Multipath and fading are common phenomena in mobile communication channels, where multiple transmission paths produce multiple delayed and faded versions of a transmitted signal at the receiver, due to principles such as reflection and scattering. The purpose of the Rake receiver is to combine these independently faded versions of the transmitted signal to achieve diversity combining, in other words a better signal to noise ratio.

The reverse channel 134 is formed of a plurality of sub-channels, each sub-channel transporting a particular data stream. In a specific example, four types of sub-channels are present, namely the Fundamental sub-channel, the Supplemental sub-channel, the Control sub-channel and the Pilot sub-channel. While the Supplemental sub-channel is typically used to carry data traffic of different rates, the Fundamental sub-channel is typically used for voice traffic. The Control sub-channel is for conveying control commands and information. The Pilot sub-channel is necessary for each mobile user, in order for the base station receiver to be able to estimate the phase and amplitude distortions experienced by the signal during transmission from the mobile station to the receiver over the physical channel.

Figure 2:
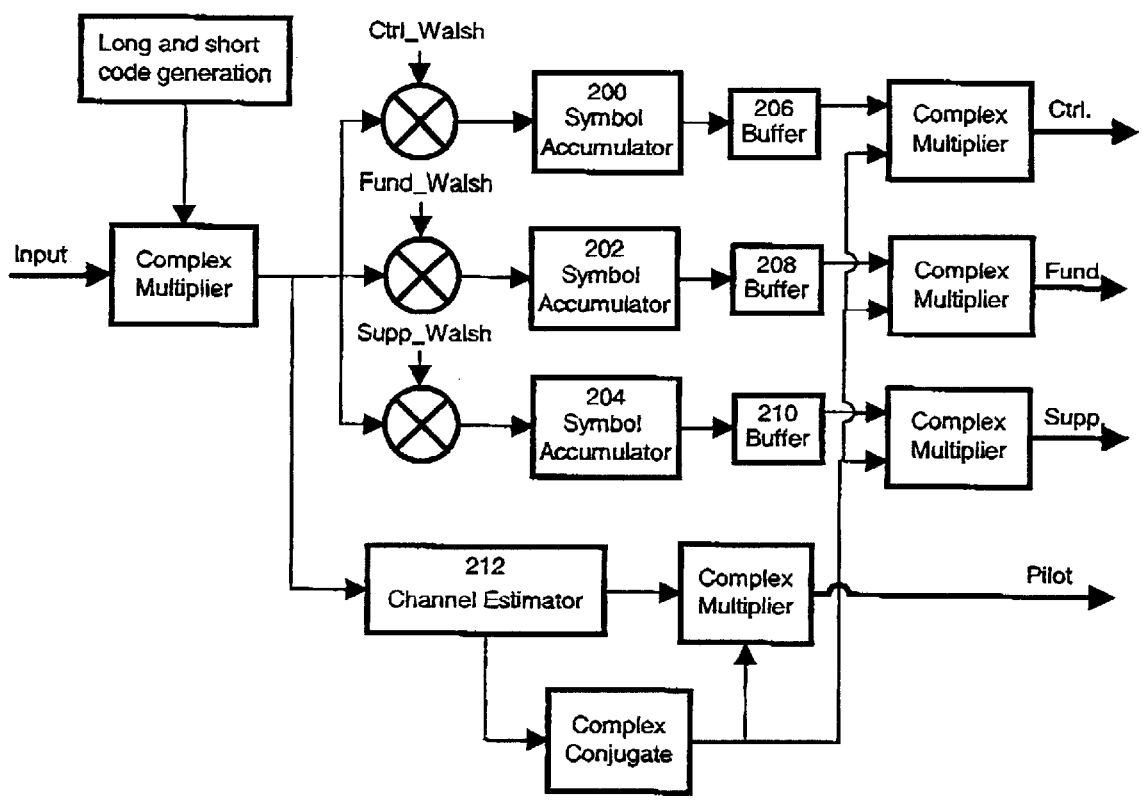
FIG. 2 is a functional block diagram depicting the operation of a demodulator, as shown in FIG. 1.

FIG. 2 is a functional block diagram depicting the operation of a single demodulator, of the bank of demodulators 100, 102, 104 and 106 shown in FIG. 1. Each demodulator first performs de-spreading by multiplying the received signal with local replicas of the long and short PN spreading codes, then performs channel separation by multiplying the de-spread output with mutual-orthogonal Walsh codes. The symbol accumulation units 200, 202 and 204 accumulate symbols within one Walsh waveform, and their outputs are buffered by buffer units 206, 208 and 210 while waiting for the channel estimate to be ready. When the channel estimation is generated by the channel estimator unit 212, its complex conjugate is multiplied to each sub-channel output. The output of the Pilot sub-channel is actually the channel estimator unit 212 output multiplied by its complex conjugate, and is used purely for SNR estimation purposes, to be described below.

The finger outputs 142, 144, 146 and 148 of the Rake receiver demodulators are supplied to a combiner functional block 108. As per the above description of the operation performed by the demodulators, each demodulator finger output is composed of up to four complex values, each value corresponding to the weighted signal of a given sub-channel. The combiner 108 is responsible simply for adding the complex values received from all four demodulator finger outputs on a per sub-channel basis, so as to output four complex values, each one representative of a particular sub-channel signal. Structurally speaking, the combiner 108 is formed of four adders, one for each sub-channel. Specifically, the combiner 108 outputs the Fundamental 150, Supplemental 152, Control 154 and Pilot 156 sub-channel complex values.

The combiner output 156 of the Pilot sub-channel is purely for SNR estimation purposes, used for reverse channel closed loop power control, to be described below.

Combiner 108 outputs 150, 152 and 154 are each fed into an extractor functional block, respectively blocks 110, 112 and 114. These blocks are responsible for extracting the Real component (Re{ }) from a complex value, in order to allow for further signal processing. The Imaginary (Im{ }) component of the complex value is used strictly for implementing closed-loop power control, as will be described below. The Real values for each of the three sub-channels are then passed on from the extractor functional blocks 110, 112 and 114 to decoders 116, 118 and 120, respectively. The structure and operation of the extractor functional blocks 110, 112 and 114 are known to those skilled in the art and no further details are necessary.

The function of an individual decoder is to estimate the encoded input signal using a rule or method that results in the minimum number of errors. In a specific example, the decoder functional blocks 116, 118 and 120 first perform de-interleaving, followed by serial Viterbi decoding. In the case of the Fundamental sub-channel signal, rate detection is also performed by decoder functional block 116 prior to signal decoding Although there are a number of techniques for decoding convolutional codes, the Viterbi algorithm which is perhaps the most popular, performs maximum likelihood decoding of convolutional codes. The technique of signal de-interleaving and the Viterbi algorithm will not be described in further detail as both are well known to those skilled in the art, and neither is critical to the success of the present invention. The outputs from the decoder functional blocks 116, 118 and 120 correspond to the decoded signals originally sent from the transmitter (i.e. mobile user), respectively the Fundamental signal 136, the Supplemental signal 138 and the Control signal 140.

A Frame Error Rate (FER) measurer functional block 128 receives as input the decoded information bits of the Fundamental 136, Supplemental 138 and Control 140 signals. The FER measurer block 128 is responsible for measuring the performance of the base station receiver, specifically checking each frame of bits to determine whether the frame is error free or not. Note that different weighting factors can be applied to different sub-channel signals in order to reflect the priority in sub-channel performance at the base station receiver. The measurement performed by the FER measurer block 128 is defined by the following ratio:

$$FER = \frac{\text{\# of frames in error}}{\text{total \# of frames received}}$$

The measured FER value is passed from the FER measurer block 128 to a threshold updater functional block 130, responsible for setting and updating the SNR threshold necessary to the generation of the power control bit. This SNR threshold is initially set at a particular starting point, itself associated with a particular FER. During the update process, if the FER received from the FER measurer block 128 is different than the FER value associated with the starting point SNR threshold, iteration is used to modify the SNR threshold to an appropriate value. This update process is based on the assumption that the relationship between the SNR threshold and the FER is not fixed. As both the FER measurer functional block 128 and the SNR threshold updater functional block 130 are well known to those skilled in the art, they will not be described in further detail. Note that in a most preferred embodiment of the present invention, functional blocks 128 and 130 are both implemented external to the CDMA receiver, however, in an alternative embodiment, they could also be implemented as internal modem components.

The signal processing functional block 122, internal to the CDMA receiver, is responsible for SNR estimation as well as for power control bit generation. The block 122 receives as inputs the four complex values 150, 152, 154 and 156 from the combiner 108, and comprises an SNR estimator functional block 124 and a logical functional block 160. The logical functional block 160 itself includes a comparator 126 and a power control bit generator 132. The SNR estimator functional block 124 includes means for processing the complex values received from the combiner 108, such as an extractor functional block, so as to separate these values into real and imaginary parts. The real parts are used to compute an estimate of the total signal energy in the sub-channels, while the imaginary parts are used to compute an estimate of the total noise energy in the sub-channels, as will be described in further detail below. Thus, the SNR estimator functional block 124 performs an estimation of the total SNR captured by the base station receiver, given the four sub-channels, each with changeable rates and relative power levels. The SNR estimation is defined by the following equation:

$$SNR = E_s/I_o$$

where $E_s$ represents the total signal chip energy and $I_o$ represents the interference and noise power spectrum density. This SNR estimation value is implemented by a particular algorithm, to be described in further detail below. The output of the SNR estimator functional block 124 is a signal that conveys the estimated SNR value.

The logical functional block 160 is responsible for generating a control signal for regulating the transmission power of the transmitter generating the CDMA signal, in this example the mobile, in dependence of the SNR estimation computed by the SNR estimator functional block 124. The comparator 126 receives as inputs the signal from the SNR estimator functional block 124 conveying the SNR estimation value and the updated SNR threshold value from the SNR threshold updater functional block 130. The SNR estimation value is compared to the SNR threshold value. If the SNR estimation value is lower than the SNR threshold value, an Increase control signal is generated by the comparator 126 and sent to the power control bit generator 132. If the SNR estimation value is higher than the SNR threshold value, a Decrease control signal is generated by the comparator 126 and sent to the power control bit generator 132.

The power control bit generator 132 is responsible for generating a power control command and sending it over the output 158 to the transmitter, in dependence of the message received from the comparator 126. The power control command is typically a single bit. In a specific example, the power control command bit will be cleared to 0 when an Increase control signal is received from the comparator 126, indicating that an increase in transmitting power is required of the transmitter. Otherwise, when a Decrease control signal is received from the comparator 126, the power control command bit will be set to 1, indicating that a decrease in transmitting power is required of the transmitter.

Figure 3:
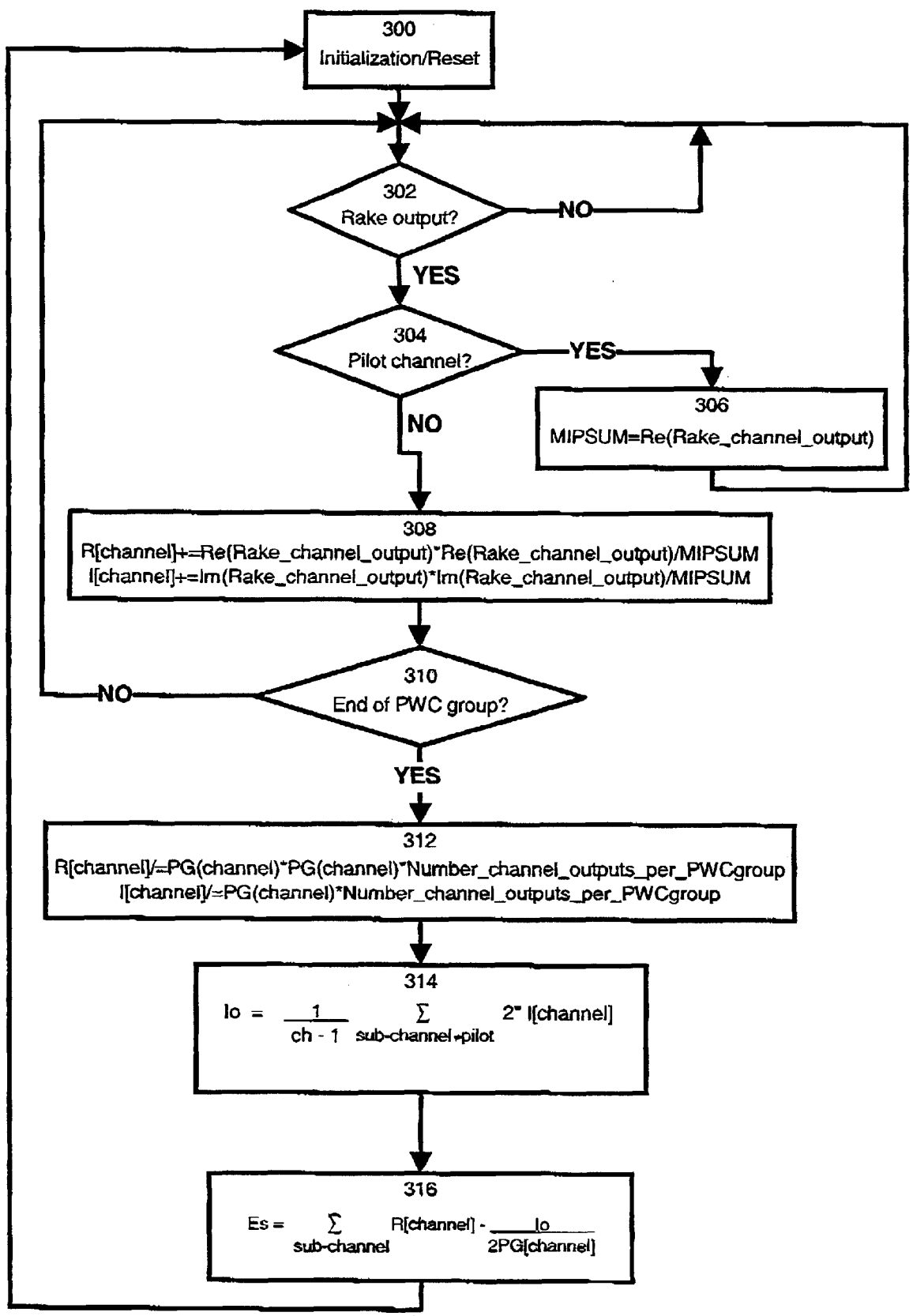
FIG. 3 is a flowchart illustrating the SNR estimation algorithm, as implemented by the SNR estimator functional block depicted in FIG. 1.

The SNR estimator functional block 124 uses the four sub-channel complex values output from the Rake combiner 108 to estimate the SNR, by implementing a particular algorithm This algorithm is independent of the power allocation ratios of sub-channels, necessary to overcome the issue of changeable relative power levels for each sub-channel which cause these ratios to be modified with time. FIG. 3 is a flowchart of the SNR estimation algorithm implemented by the SNR estimator functional block 124. The following is a step by step description of the algorithm, in relation to each of the flowchart elements shown in FIG. 3.

300. Initialization/Reset

The first step in the algorithm is the initialization of two arrays R[channel] and I[channel] to 0, where channel is a four-value vector given by channel={Fundamental, Supplemental, Control, Pilot}. For example:

$$R[\text{Fundamental}] = R[\text{Supplemental}] = R[\text{Control}] = R[\text{Pilot}] = 0$$

302. Rake Output?

The Rake receiver will provide output at coded bit rates of the Fundamental, Supplemental and Control subchannels, as well as at the unmodulated estimation rate of the Pilot sub-channel. A coded bit rate results from channel encoding, before spreading, and is always lower than the chip rate, which is the rate of the PN sequence or spread signal, and consequently the highest possible rate of signal. Assuming that the Rake output is checked at the chip rate, and given that the coded bit rates may all be different, new data may not necessarily be present at all of the combiner 108 outputs at all chip instances. Rather, the presence of new data will vary between the combiner outputs, with the possibility of there being no new data at all for a certain chip instance. Therefore, the SNR estimator functional block 124 needs to be informed when there is new data at any one of the combiner 108 outputs 150, 142, 154 and 156, and a variety of methods may be used for doing so. In a most preferred embodiment, the SNR estimator functional block 124 performs self-calculation, based on the knowledge of the fixed rate associated with each sub-channel, in order to determine when new data is available at a particular combiner 108 output. Alternatively, the combiner 108 can inform the SNR estimator functional block 124 by interrupt of the availability of new data, the interrupt message including an indication of the particular combiner output having new data. In another alternative, the SNR estimator functional block 124 can periodically poll the different combiner 108 outputs in order to check for new data.

304. Pilot Channel

If the new data at the combiner 108 output is from the Pilot sub-channel, it is used to set the total multipath energy value received by the base station receiver. This multipath energy value is the real component of the Pilot sub-channel complex value 156, denoted as MIPSUM and defined by the following equation:

MIPSUM=$Re$(Rake_pilot_output)

If, on the other hand, the new data at the combiner 108 output is from one of the other three sub-channels, the signal energy is calculated and normalized, and is added to the R and I arrays, indexed for that specific sub-channel, as defined below:

$R$[channel]+=$Re$(Rake_channel_output)*$Re$(Rake_channel_output)/MIPSUM $I$[channel]+=$Im$(Rake_channel_output)*$Im$(Rake_channel_output)/MIPSUM In a specific example, assume the new data is from the Control sub-channel 152. The above two equations become:

$R$[control]+=$Re$(Rake_control_output)*$Re$(Rake_control_output)/MIPSUM $I$[control]+=$Im$(Rake_control_output)*$Im$(Rake_control_output)/MIPSUM 310. End of PWC Group The SNR estimator functional block 124 next checks for the end of a Power Control (PWC) group. Each frame of data being transmitted is divided into 16 PWC groups, where a PWC group is a collection of data which is controlled together. Known to the SNR estimator functional block 124 is the number of sub-channel outputs associated with a particular PWC group, for example 576 Supplemental outputs, 12 Fundamental outputs and 6 Control outputs. Therefore, a simple counting process is performed by the SNR estimator functional block 124 in order to determine the end of a PWC group, if not at the end of a PWC group, the SNR estimator functional block 124 will wait for further output from the combiner 108, returning to step 302 above. Once the end of a PWC group is reached, the signal and noise power estimation is calculated as per the following equations.

312. For Channel={Fundamental, Supplemental, Control}:

$R$[channel]/=$PG$[channel]*$PG$[channel]*Number_channel_outputs_per_PWCgroup $I$[channel]/=$PG$[channel]*Number_channel_outputs_per_PWCgroup where PG[channel] is the processing gain for the channel, a three-value vector where each value is specific to a particular sub-channel, as defined by the following equation:

$$PG[\text{channel}] = \frac{\text{chip rate}}{\text{data\_rate[channel]}}$$

The chip rate is the rate of the PN sequence, as defined above, while data_rate[channel] is a three-value vector, each value representative of the coded bit rate of a specific sub-channel after channel encoding. Taking for example the case where the chip rate is 3.6864 MHz, the Supplemental sub-channel has a coded bit rate of 460.8 kbps, the Fundamental sub-channel has a coded bit rate of 9.6 kbps and the Control sub-channel has a coded bit rate of 4.8 kbps, we see:

$PG$[channel]=$PG$[Supplemental, Fundamental, Control]=[8,384, 768]

The variable Number_channel_outputs_per_PWCgroup corresponds to the number of Rake outputs in one power control group for a specific sub-channel. For example, when a power control group is 1.25 ms for a Supplemental sub-channel with a coded bit rate of 460.8 kbps, a Fundamental sub-channel with a coded bit rate of 9.6 kbps and a Control sub-channel with a coded bit rate of 4.8 kbps, this variable becomes, for each sub-channel:

Number_Supplemental_outputs_per_PWCgroup= 1.25*460.8=576

Number_Fundamental_outputs_per_PWCgroup= 1.25*9.6=12

Number_Control_outputs_per_PWCgroup= 1.25*4.8=6

314. The noise and interference $I_o$ is calculated as:

$$I_o = \frac{1}{ch-1} \sum_{sub-channel \neq pilot} 2 \cdot I[\text{channel}]$$

The signal energy $E_s$ is calculated as:

$$E_s = \sum_{sub-channel} R[\text{channel}] - \frac{I_o}{2PG[\text{channel}]}$$

where ch is the number of sub-channels per channel, including the Pilot sub-channel. The first summation, for calculating $I_o$, is performed over all sub-channels except the Pilot sub-channel. The second summation, for calculating $E_s$, is performed over all sub-channels. Finally, the signal to noise ratio is estimated to be SNR=$E_s/I_o$. The estimation produced by the above described algorithm avoids any inaccuracy due to changeable sub-channel relative power levels, critical as the control power bit generation by the base station receiver is dependent on an accurate estimation.

The SNR estimator functional block 124 sends the SNR estimation to the comparator 126, where it is used to determine the power control bit, as described above. As the SNR at the base station receiver is continuously changing, the measurement algorithm implemented by the SNR estimator functional block 124 repeats itself. This is shown in FIG. 3, where step 316 is succeeded by step 300.

Although the present invention has been described in considerable detail with reference to certain preferred embodiments thereof, variations and refinements are possible without departing from the spirit of the invention as have been described throughout the document. Therefore, the scope of the invention should be limited only by the appended claims and their equivalents.

I claim:

1. An apparatus for generating a control signal suitable to regulate a transmission power of a transmitter generating a CDMA signal transported in a main channel including a plurality of sub-signals transported in respective subchannels of the main channel, said apparatus including:
   a plurality of demodulators that receive the CDMA signal, wherein each demodulator despreads the CDMA signal to produce a despread CDMA signal, wherein each demodulator covers the despread CDMA signal with a plurality of Walsh codes respective to the subchannels, and wherein each demodulator produces a plurality of demodulator outputs, wherein each demodulator output respective to one of the plurality of sub-signals, and wherein each of the plurality of demodulators includes:
      a despreader that despreads the CDMA signal based upon at least one of a long code and a short code to produce the despread CDMA signal;
      a plurality of multipliers each of which mixes the despread CDMA signal with the plurality of Walsh codes corresponding to the plurality of subchannels; and
      a plurality of symbol accumulators, each of which couples to an output of a respective multiplier and produces a respective demodulator output;
   a combiner functional block that receives the plurality of demodulator outputs from the plurality of demodulators and combines the plurality of demodulator outputs to produce the plurality of sub-signals;
   an SNR estimator functional block operatively coupled to the combiner functional block for receiving the plurality of sub-signals, wherein the SNR estimator functional block computes an estimate of a ratio of a total signal energy in the plurality of sub-signals to a total noise energy in the plurality of sub-signals; and
   a logical functional block coupled to said SNR estimator functional block to generate at an output the control signal suitable to regulate the transmission power of the transmitter generating the CDMA signal in dependence of the estimated ratio of a total signal energy in the plurality of sub-signals to a total noise energy in the plurality of sub-signals computed by said SNR estimator functional block.

2. The apparatus of claim 1, further comprising:
   a Frame Error Rate (FER) Measurer operably coupled to the output of the combiner functional block that determines FERs corresponding to at least some of the sub-signals and that produces a composite FER; and
   a threshold updater that produces a threshold based upon the composite FER that the logical functional block uses in generating the control signal.

3. An apparatus as defined in claim 1, wherein the apparatus complies with at least one version of the IS-95 Air Interface Standard.

4. An apparatus as defined in claim 1, wherein each of the demodulators further includes:
   a channel estimator that receives the despread CDMA signal and that produces a channel estimate based upon the despread CDMA signal;
   a plurality of buffers, each of which couples to an output of a respective symbol accumulator; and
   a plurality of complex multipliers, each of which receives an output of a respective buffer of the plurality of buffers and the channel estimate and produces a demodulator output respective to one of the plurality of sub-signals.

5. The apparatus as defined in claim 1, wherein the logical functional block comprises:
   a comparator that compares the threshold to the ratio of the total signal energy in the plurality of sub-signals to the total noise energy in the plurality of sub-signals; and
   a power control bit generator operably coupled to an output of the comparator that produces a power control bit as the control signal based upon the output of the comparator.

6. An apparatus as defined in claim 1, wherein:
   the CDMA signal is produced by a mobile terminal;
   the CDMA signal is received by a base station; and
   the control signal is produced by the base station, transmitted to the mobile terminal, and used for reverse link power control operations by the mobile terminal.

7. An apparatus for generating a control signal suitable to regulate the transmission power of a transmitter generating a CDMA signal that is transported in a main channel to the apparatus, the CDMA signal including a plurality of sub-signals transported in respective subchannels of the main channel, the apparatus including:
   a rake receiver that receives the CDMA signal transported in the main channel, wherein the rake receiver includes a plurality of demodulators, each of which receives a multi-path component of the CDMA signal and extracts respective sub-signal components of the plurality of sub-signals, wherein the each of the demodulators includes:
      a despreader that despreads the CDMA signal based upon at least one of a long code and a short code to produce a despread output;
      a plurality of multipliers that perform channel separation by mixing the despread output with respective Walsh codes corresponding to the plurality of sub-signals; and
      a plurality of symbol accumulators, each of which couples to an output of a respective multiplier and accumulates the output of a respective multiplier to produce a respective sub-signal component of the plurality of sub-signals;
   a combiner operably coupled to the rake receiver to receive the respective sub-signal components of the plurality of sub-signals from the plurality of demodulators of the rake receiver, wherein the combiner combines the respective sub-signal components of each sub-signal of the plurality of sub-signals to produce the plurality of sub-signals;
   an SNR estimator operatively coupled to the combiner, wherein the SNR estimator computes an estimate of a ratio of a total signal energy in the plurality of sub-signals to a total noise energy in the plurality of sub-signals;

a logical functional block operably coupled to the SNR estimator, wherein the logical functional block generates the control signal suitable to regulate the transmission power of the transmitter generating the CDMA signal based upon the ratio of the total signal energy in the plurality of sub-signals to the total noise energy in the plurality of sub-signals computed by the SNR estimator functional block.

8. An apparatus as defined in claim 7, wherein the apparatus complies with at least one version of the IS-95 Air Interface Standard.

9. An apparatus as defined in claim 7, wherein each of the demodulators further includes:
a channel estimator that receives the despread signal and that produces a channel estimate based upon the despread signal;
a plurality of buffers, each of which couples to an output of a respective symbol accumulator; and
a plurality of complex multipliers, each of which receives an output of a respective buffer and the channel estimate and produces a respective sub-signal component of the plurality of sub-signal components of the plurality of sub-signals.

10. An apparatus as defined in claim 7, further comprising:
a plurality of decoders operably coupled to the combiner, each of which receives a respective sub-signal from the combiner and extracts data corresponding to the respective sub-signal;
a Frame Error Rate (FER) Measurer operably coupled to the plurality of decoders that determines FERs corresponding to at least some of the plurality of sub-signals based upon data received from the plurality of decoders and that produces a composite FER based thereupon; and
a threshold updater operably coupled to the FER Measurer that produces a threshold based upon the composite FER that the logical functional block uses in generating the control signal.

11. An apparatus as defined in claim 10, wherein the logical functional block comprises:
a comparator that compares the threshold to the ratio of the total signal energy in the plurality of sub-signals to the total noise energy in the plurality of sub-signals; and
a power control bit generator that produces a power control bit as the control signal based upon an output of the comparator.

12. An apparatus as defined in claim 7, wherein:
the CDMA signal is produced by a mobile terminal;
the CDMA signal is received by a base station; and
the control signal is produced by the base station, transmitted to the mobile terminal, and used for reverse link power control operations by the mobile terminal.

13. A method for generating a control signal suitable to regulate the transmission power of a transmitter generating a CDMA signal that is transported and received in a main channel, the CDMA signal including a plurality of sub-signals transported in respective subchannels of the main channel, the method comprising the steps of:
receiving a plurality of a multi-path components of the CDMA signal;
for at least some of the multi-path components of the CDMA signal:
a despreader despreading the multi-path component of the CDMA signal based upon at least one of a long code and a short code to produce a despread output;
a plurality of multipliers separately mixing the despread output with a plurality of Walsh codes respective to the sub-signals to produce sub-signal components of the plurality of sub-signals corresponding to the multi-path component of the CDMA signal; and
a plurality of symbol accumulators accumulating the sub-signal components of the plurality of sub-signals;
combining accumulated sub-signal components of the plurality of sub-signals to produce the plurality of sub-signals;
computing an estimate of a ratio of a total signal energy in the plurality of sub-signals to a total noise energy in the plurality of sub-signals; and
generating the control signal suitable to regulate the transmission power of the transmitter generating the CDMA signal based upon the computed estimated ratio of a total signal energy in the plurality of sub-signals to a total noise energy in the plurality of sub-signals.

14. A method as defined in claim 13, further comprising:
producing a channel estimate based upon the despread output; and
producing the plurality of sub-signals based upon the channel estimate.

15. A method as defined in claim 13, further comprising:
extracting data from each of the sub-signals;
determining a Frame Error Rate (FER) for at least some of the plurality of sub-signals;
determining a composite FER based upon the FER for the at least some of the plurality of sub-signals; and
producing a threshold based upon the composite FER; and
using the threshold to generate the control signal.

16. A method as defined in claim 13, wherein:
the CDMA signal is produced by a mobile terminal;
the CDMA signal is received by a base station; and
the control signal is produced by the base station, transmitted to the mobile terminal, and used for reverse link power control operations by the mobile terminal.

* * * * *

UNITED STATES PATENT AND TRADEMARK OFFICE
CERTIFICATE OF CORRECTION

PATENT NO.    : 6,717,976 B1
DATED         : April 6, 2004
INVENTOR(S)   : Qiang Shen It is certified that error appears in the above-identified patent and that said Letters Patent is hereby corrected as shown below:

Title page,
Item [73], Assignee, should be listed as -- Nortel Networks Limited, St. Laurent, Quebec, Canada --

Signed and Sealed this

Third Day of August, 2004

JON W. DUDAS
*Acting Director of the United States Patent and Trademark Office*